Patented Apr. 21, 1942

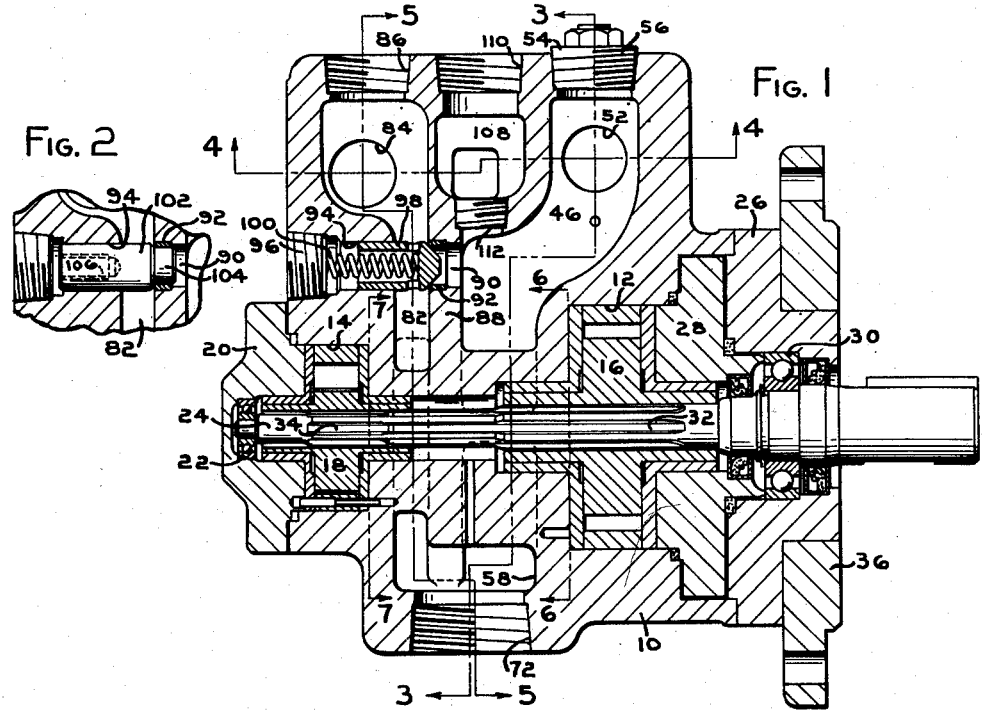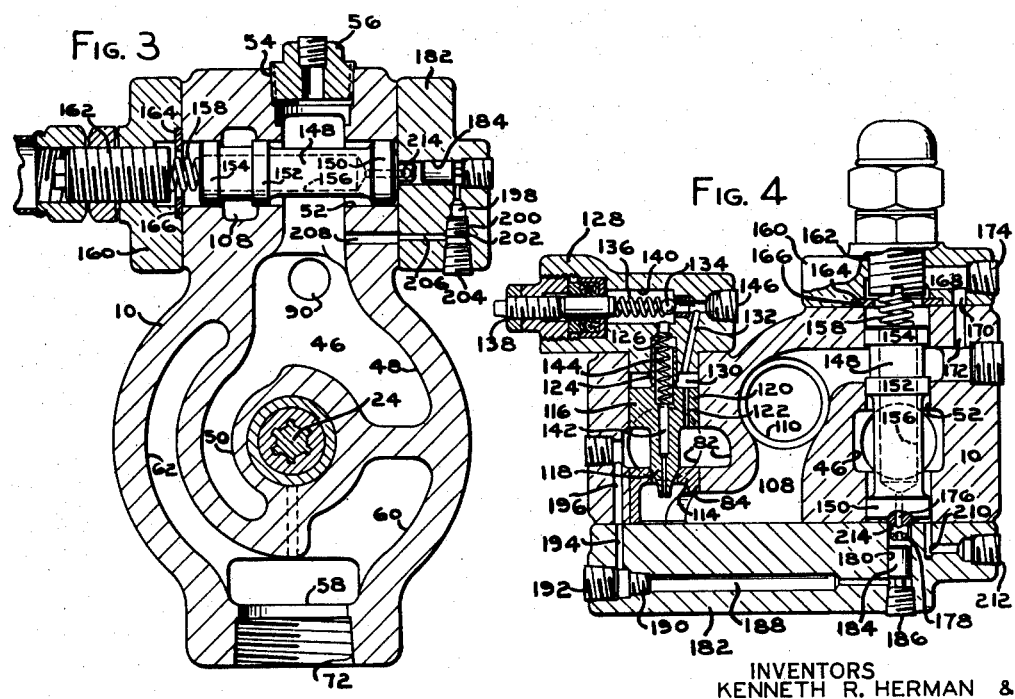

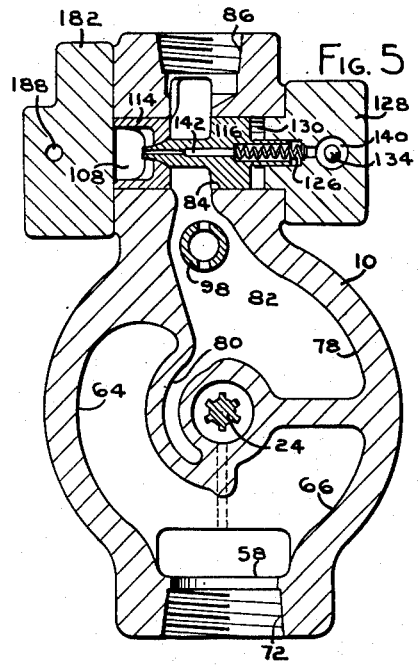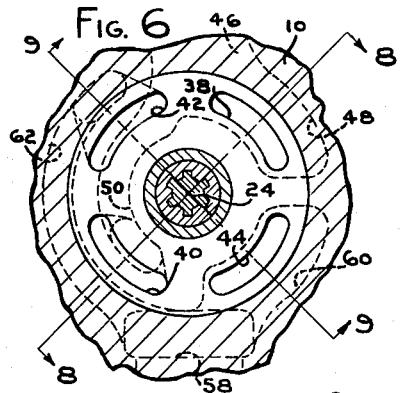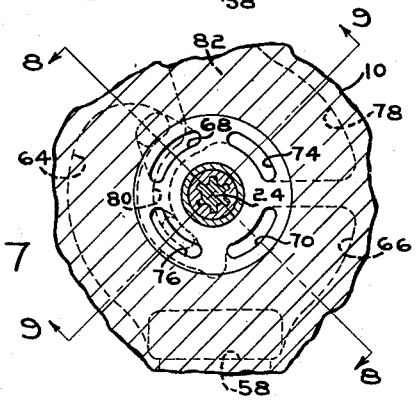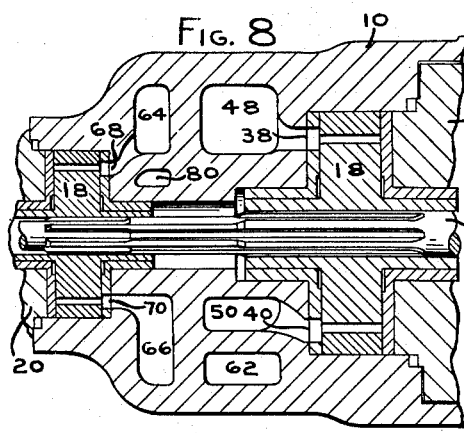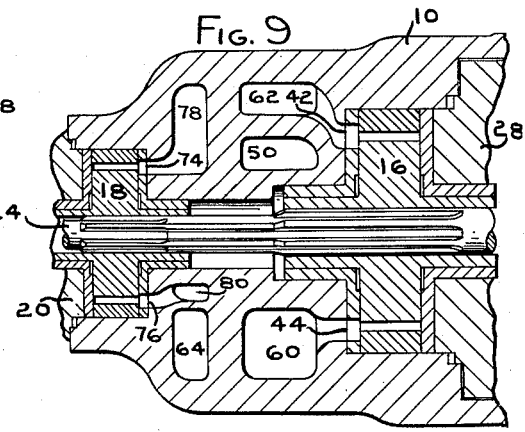
INVENTORS
KENNETH R. HERMAN &
FERRIS T. HARRINGTON
BY
Ralph L. Twesdale
ATTORNEY

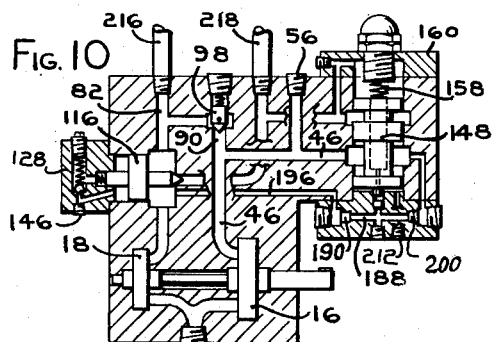
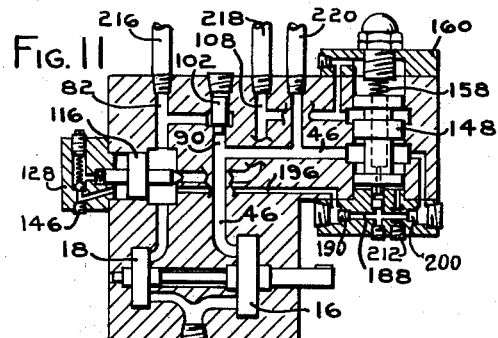
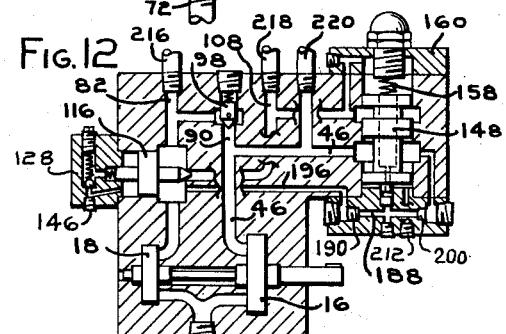
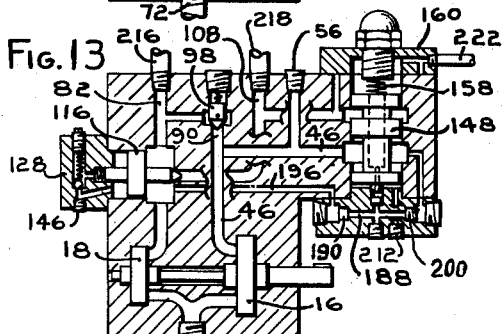
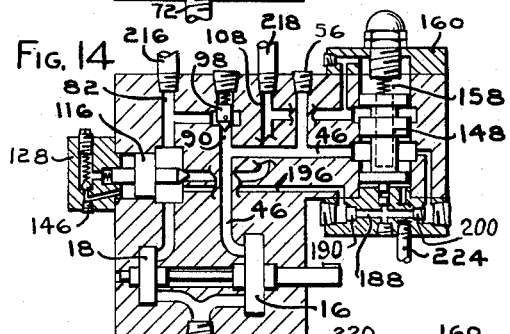
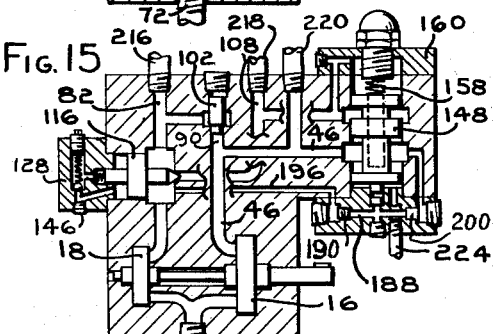
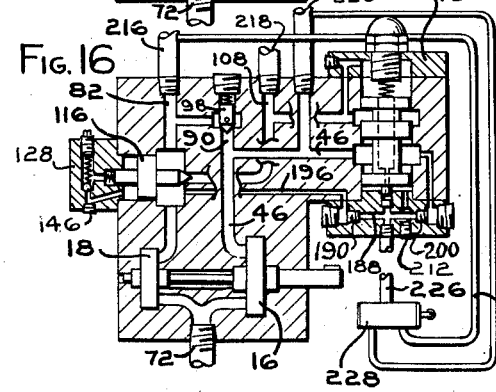
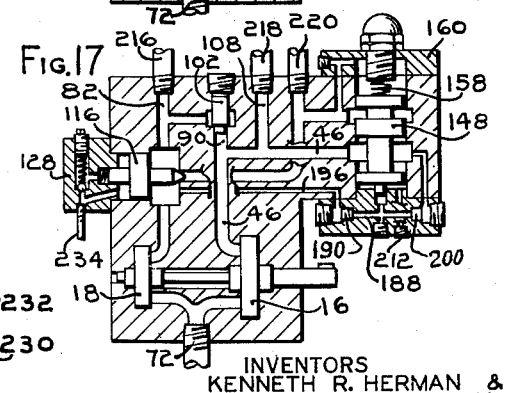

2,280,392

UNITED STATES PATENT OFFICE 2,280,392

POWER TRANSMISSION

Kenneth R. Herman and Ferris T. Harrington, Detroit, Mich., assignors to Vickers Incorporated, Detroit, Mich., a corporation of Michigan Application January 10, 1940, Serial No. 313,170

14 Claims. (Cl. 103—11)

This invention relates to power transmissions, particularly to those of the type comprising two or more fluid pressure energy translating devices, one of which may function as a pump and another as a fluid motor.

The invention is particularly concerned with a multiple pumping unit for use in power transmission systems of this character. Hydraulic power transmission systems such as those used for operating machine tool slides frequently utilize a plurality of pumps both for actuating a single hydraulic motor in some cases and in other cases for actuating a plurality of hydraulic motors. For example, it is common in actuating a single hydraulic motor such as a cylinder and piston connected to a machine tool table or slide to provide a large volume-low pressure pump and a small volume-high pressure pump. The delivery from both pumps may be utilized to provide a rapid traverse movement of the motor while only the small volume pump is utilized for providing a feeding movement of the motor. In another example, separate hydraulic motors are separately connected to individual pumps which may be driven from a common prime mover. In addition, there are many different hydraulic circuit hookups which utilize a plurality of pumps in various other ways.

It is desirable from the standpoint of compactness and simplicity to incorporate in a multiple pumping unit certain of the control valves which are customarily utilized in hydraulic circuits of this character. Due to the great number of variations in function required of such control valves if they are to meet the requirements of the many circuit hookups commonly used, it has heretofore been unfeasible to manufacture such combined pump and valve units except in the case of one or two of the more commonly used circuit hookups.

It is an object of the present invention to provide a multiple pump unit in which is incorporated a plurality of control valves and which by selective assembly of a few critical parts may be made to serve the requirements of a large number of unusual as well as more common hydraulic circuit hookups.

A further object is to provide a pumping unit of this character which is of simple, compact and reliable construction and which may be produced at low cost and may with little trouble be altered after manufacture to meet different circuit requirements.

Further objects and advantages of the present invention will be apparent from the following description, reference being had to the accompanying drawings wherein a preferred form of the present invention is clearly shown.

In the drawings:

Figure 1 is a longitudinal cross section of a pumping unit embodying a preferred form of the present invention.

Figure 2 is a fragmentary cross section corresponding to a portion of Figure 1 showing a selective variation in assembly of the parts.

Figure 3 is a cross section on line 3—3 of Figure 1.

Figure 4 is a cross section on line 4—4 of Figure 1.

Figure 5 is a cross section on line 5—5 of Figure 1.

Figure 6 is a cross section on line 6—6 of Figure 1.

Figure 7 is a cross section on line 7—7 of Figure 1.

Figure 8 is a cross section on line 8—8 of Figures 6 and 7.

Figure 9 is a cross section on line 9—9 of Figures 6 and 7.

Figures 10 through 17 are diagrammatic views of the internal circuit of the combined pump and valve unit showing several of the possible selective variations of such circuit.

Referring now to Figure 1, there is shown a main body 10 having two cylindrical recesses 12 and 14 in which are mounted rotary pumping units 16 and 18. The latter may be of any suitable type and as shown are similar to the vane pump described in the patent to Harry F. Vickers, No. 1,989,900. An end cap 20 is mounted on the body 10 to retain the pump unit 18 in the recess 14 and carries a bearing 22 in which one end of a shaft 24 is rotatably mounted. An end cap 26 and filler block 28 retain the pump unit 16 in the recess 12, the end cap carrying a bearing 30 in which the other end of the shaft 24 is rotatably mounted. The shaft is splined at 32 and 34 to provide a driving connection for each of the pump units. A suitable mounting flange 36 is secured to the end plate 26 to form a means of attachment of the pump unit to a suitable support. Suitable cap screws or other fastening means, not shown, are provided for holding the end plates at 20, 26 and 36 together.

The pump unit 16 is provided with two diametrically opposite delivery ports 38 and 40 (see Figure 6) and two diametrically opposite suction ports 42 and 44. The body 10 is provided with a cored passage 46 which has arcuate branches 48 and 50 extending partially around the shaft 24 to connect with the delivery ports 38 and 40. The passage 46 forms a delivery conduit for the pump unit 16 and extends to one side (toward the top in Figure 1) of the pumping unit where it is intersected by a transverse bore 52 (see Figures 1 and 3). The passage also extends to the outside of the body 10 where a threaded connection 54 is provided to receive a plug 56 or a pipe, as may be desired.

The suction ports 42 and 44 of the pump unit 16 communicate with a cored passage 58 having arcuate branches 60 and 62 extending partially around the shaft 24, the branch 62 being disposed radially outward of the branch 50 of the delivery passage 46. The passage 58 extends longitudinally across the bottom portion of the body 10, as shown in Figure 1, and has a pair of arcuate branches 64 and 66 (see Figure 7) communicating with the suction ports 68 and 70 of the pump unit 18. A threaded connection hole 72 is provided at the bottom of the body 10 to form a suction inlet for both pump units. The delivery ports 74 and 76 of the pump unit 18 communicate with the arcuate branches 78 and 80 of a cored passage 82 which forms the delivery conduit for pump unit 18. The passage 82 also extends to one side (toward the top) of the pump unit 18 and intersects with a transverse bore 84, as shown in Figure 5. A threaded connection hole 86 communicates with the passage 84 for connection to a delivery pipe.

It will be noted that the two delivery passages 46 and 82 have a common wall 88 which separates them at about their mid-portion. A passage 90 extends through the wall 88 and is provided with an inserted annular seat 92. In alignment with the passage 90 is a bore 94 extending to the outside of the body unit and normally closed by a suitable closure such as the threaded pipe plug 96. Mounted in the passage 90 and bore 94 is a check valve 98 which is normally urged into contact with the seat 92 by a spring 100 which abuts against the plug 96. Thus the passage 90 is open to free flow from passage 46 to passage 82 but is closed automatically to flow in the opposite direction. Selectively interchangeable with the check valve 98 is a plug 102, shown in Figure 2, which has a reduced cylindrical portion 104 adapted to tightly fit the interior of the seat 92. The main portion of the plug 102 may also be a tight fit in the bore 94, a suitable threaded bore 106 being provided for reception of a pulling tool to remove the plug 102.

At the upper side of the body 10 there is formed a somewhat S-shaped passage 108 (see Figures 1 and 4) which intersects the bores 52 and 84 at points spaced from their intersection with the passages 46 and 82. The passage 108 may be termed a relief passage and is provided with a threaded connection hole 110 opening to the upper face of the body 10 for the reception of a pipe leading to the usual liquid reservoir or tank. As shown in Figure 1, the passage 108 is separated from the passage 46 by a plug 112 which closes a hole provided for the purpose of rendering the cored passages more accessible for cleaning during manufacture.

Pressed in the bore 84 (see Figure 4) is a cylindrical valve seat 114. Slidably mounted in the opposite end of bore 84 is a relief valve 116 having a conical valve portion 118 normally closing the seat 114. The valve has a piston 120 provided with a restricted passage 122 therethrough and is further provided with a tubular pilot 124 slidable in a bore 126 in an end cap 128. The latter is secured to the outer face of the body 10 to close the bore 82 and provides a control chamber 130 for the relief valve 116. A passage 132 in the cap 128 extends between the chamber 130 and a spring-loaded ball relief valve 134. The spring 136 of the latter is adjustable by the customary abutment screw 138. The chamber 140 in which the ball and spring are located communicates with the bore 126 and through a central bore 142 in the valve 116 with the relief passage 108. A spring 144 biases the relief valve 116 downwardly in Figure 4. A threaded connection hole 146 is provided for external connection to the passage 132 when it is desired to control the valve 116 remotely by venting the chamber 130. The relief valve 116 and its associated parts may be similar to the valve described in the patent to Harry F. Vickers, No. 2,043,453, and reference to that patent may be had for a fuller disclosure of the action thereof. Briefly, the valve 116 acts to maintain the passage 82 closed off from communication with the relief passage 108 until a predetermined maximum pressure is reached in the passage 82 at which point the valve 116 opens to whatever degree may be required to prevent the pressure from rising beyond that point. Also the valve may be opened at any pressure by venting the chamber 130 to tank.

Slidably mounted in the bore 52 is a spool valve 148 having a land 150 at the bottom and lands 152 and 154 at the top. The land 152 normally closes off the passage 46 from communication with the relief passage 108, but when the spool is lifted a predetermined amount, the land 152 moves upwardly into the passage 108 thus opening communication from passage 46. The spool 148 is provided with an internal bore 156 in which is received a spring 158 normally biasing the spool downwardly in Figure 4.

The upper end of the bore 52 is closed by an end cap 160 in which is mounted an adjusting screw 162 for varying the pressure on the spring 158. The cap is recessed at 164 for reception of a stop washer 166 acting as an abutment for the screw 162 at the lower limit of its motion and also as an abutment for the spool 148 at the upper limit of its motion. A passage 168 in the cap 160 has a branch 170 which, in the position of the cap shown, registers with a branch passage 172 in the body 10 which extends to the relief passage 108. The cap 160 is secured to the body 10 by four cap screws, not shown, at its four corners and may be mounted in either of two positions angularly spaced by ninety degrees.

In the position illustrated in Figure 4, the passage 170 registers with the passage 172 thereby connecting the upper end of bore 52 with the relief passage 108 for breathing action. When the cap 160 is mounted on the body in a position ninety degrees away from that shown, the passages 170 and 172 are out of register. In this position a plug 174 which closes the open end of passage 168 may be removed and a pilot control conduit connected in at this point for the purpose of selectively admitting pressure oil to or exhausting the upper end of bore 52.

The spool 148 is also provided with a small bore 176 at its lower end whereby the chamber at the lower end of bore 52 is always in communication with the chamber at the upper end thereof. The spool is provided with a small cylindrical extension 178 projecting into, but smaller in diameter than, a bore 180 formed in an end cap 182 which is secured to the body 10. The end cap 182 not only closes the lower end of bore 52 but also the lower end of bore 84 and that portion of the relief passage 108 which extends to the outside of the body 10.

For the purpose of lifting the spool 148 against the pressure of the spring 158 there is slidably mounted in the bore 180 a small piston 184 adapted to abut the extension 178 and lift the spool whenever pressure is admitted to the lower end of bore 180 beneath the piston 184. The cap 182 includes means for selectively rendering the piston 184 responsive to pressure oil from various sources. Thus a plug 186 is provided at the lower end of bore 180 and may be removed to provide a connection for a pilot control conduit whereby the piston 184 may be lifted by oil pressure directed from a remote pilot control valve. Also communicating with the lower end of bore 180 is a passage 188 having a threaded portion 190 in which a plug may be mounted. For the purpose of providing access to the threaded portion 190, the lefthand end of bore 188 is provided with a removable plug 192. At a point to the left of the threaded portion 190, a branch passage 194 extends to the face of the plate 182 adjacent body 10 and registers with a passage 196 which extends to the delivery conduit 82.

Referring now to Figure 3, the plate 182 is also provided with a passage 198 which communicates with the lower end of bore 180 and has a threaded portion 200 in which a plug 202 may be selectively mounted. A plug 204 closes the end of passage 198 and provides access to remove or replace the plug 202. Beyond the threaded portion 200 a branch passage 206 extends to the face of the plate 182 and registers with a passage 208 which communicates with the delivery conduit 46. It will thus be apparent that by selective placement of plugs in threaded portions 190 and 200 the bore 180 may be placed in communication either with delivery conduit 82 or delivery conduit 46.

In addition, the plate 182 is provided with means for selectively lifting the spool 148 independently of piston 184. Thus a right-angled passage 210 communicates with the space at the end of bore 52 and has a threaded connection hole 212 which may be either plugged, as shown, or connected to a pilot control pipe for admission of pressure fluid under the direction of a remote pilot control valve. In order to prevent pressure oil admitted through the conduit 210 from being conducted through the center of valve spool 148 to the opposite end of bore 52, the extension 178 is provided with a transverse bore 214 of larger diameter than the bore 176 and in which a plug may be pressed.

In operation, it will be seen that both pump units 16 and 18, when the shaft 24 is rotated, will withdraw oil through the suction connection 72 and suction passage 58. This oil is drawn in through suction ports 42 and 44 of the pump 16 and delivered through delivery ports 38 and 40 and into the delivery conduit 46. Pump 18 withdraws oil through the suction ports 68 and 70 and delivers it through delivery ports 74 and 76 to the delivery conduit 82.

With the parts of the control valves assembled as shown in Figures 1, 3 and 4, and as shown diagrammatically in Figure 10, the discharge from pump 18 passes directly through conduit 82 to a pipe such as 216 so long as the pressure in that pipe remains below the setting of the relief valve 116. It will be noted that valve 148 has its operating piston 184 in communication with the discharge conduit 82 through passages 196, 194 and 188. Thus so long as the pressure in pipe 216 is below the setting of the spring 158, valve 148 remains closed and the entire discharge from the pump 16 as well is delivered through conduit 46 and check valve 98 to the pipe 216.

Under these conditions the delivery of both pumps is carried to the single outlet pipe 216, and if the latter be connected to a fluid motor such as a machine tool cylinder, the piston of the latter will move at a rapid traverse rate. As resistance to this movement is encountered, either by meeting the work or by operation of a suitable flow rate reducing valve, the pressure in line 216 will build up and, being transmitted to the small piston 184, will overcome the force of spring 158 opening the valve 148. This permits the delivery of pump 16 to be by-passed to tank through the relief passage 108 and a pipe such as 218 leading to the tank. Normally the setting of spring 158 is such as to permit valve 148 to open at a pressure considerably lower than that at which valve 116 operates when the pump unit is arranged for operation in this manner.

The pressure having built up in pipe 216 and conduit 82, check valve 98 will close preventing return flow from conduit 82 to conduit 46 and the continued high pressure in conduit 82 will lift the valve 148 to its full opening thus completely unloading the pump 16. The valve 116 under these conditions of operation acts merely as a maximum pressure limiting valve for the pump 18. It will thus be seen that by assembling the parts of the pump unit as disclosed in Figures 1, 3, 4 and 10, the unit is readily adaptable to circuits which require under one condition a large volume of fluid at a relatively low pressure and under another condition a smaller volume of fluid at a relatively high pressure.

To adapt the pump unit to another purpose wherein two separate and independent pumps are required, the plug 202 may be removed from the threaded portion 200 of Figure 3 and placed in the threaded portion 190 of Figure 4. In addition, the plug 56 may be removed from the threaded opening 54 of Figure 1 and a second delivery pipe such as 220 connected thereto. Also, the plug 96 may be removed and the plug 102 substituted for the check valve 98 after which the plug 96 is replaced. Under these conditions, the pump 18 delivers its full volume through conduit 82 to pipe 216, the maximum delivery pressure being solely controlled by the valve 116 in the usual manner. Due to the passage 90 being plugged, the full discharge of pump 16 will be delivered through conduit 46 to pipe 220. Under these conditions, the valve 148 acts as a relief valve for the conduit 46 since its operating piston 184 is directly responsive to pressures in the delivery conduit 46.

For circuit applications which require a sequential delivery of fluid, first to one hydraulic motor at a low pressure and then to a second motor, first at large volume and low pressure and then at small volume and high pressure, the pumping unit may be assembled as disclosed in Figure 12. An example of a circuit of this nature may be found in machine tools where it is desired to clamp the work by a hydraulic cylinder and hold it clamped during the hydraulic actuation of a tool slide at rapid traverse and feed rates. The pump unit is adapted for this type of operation by mounting the plug 202 in the threaded portion 190, as shown in Figure 12, and by replacing the check valve in the passage 90. The pipe 220 delivers the discharge from pump 16 to the clamping cylinder, and when the latter stalls at the end of its stroke, the check valve 98 opens permitting the discharge of both pumps to be delivered to the main slide through conduit 216. As soon as pressure builds up above the setting of valve 148 the main slide goes into feed movement, check valve 98 closes, and valve 148, acting as a relief valve for conduit 46, maintains the pressure therein and the pressure on the clamping cylinder at a predetermined maximum value.

The pump unit may be also adapted to a special circuit which is commonly used on injection molding machines. Such a circuit operates in the same manner as that of Figure 10 except that the unloading valve 148 is momentarily disabled during the stroke of the injector piston of the molding machine. This feature is desirable in order to maintain the speed of the injector piston independently of the resistance encountered and even though a momentary overload on the prime mover which drives the pump unit may be entailed. For this purpose the plug 202 is replaced in the threaded portion 200, the check valve 98 being in place and the connection 54 being blocked by plug 56. Thus the conduit 216 is the sole delivery conduit from the pump unit. In addition, the end cap 160 of the valve 148 is rotated ninety degrees to block the drainage connection 170—172, and the plug 174 is replaced by a pilot control line 222. The latter leads from a pilot valve which selectively admits pressure oil to the passage 168 during the stroke of the injector piston and which connects the passage 168 to exhaust at all other times.

Thus during operation of the main slides of the molding machine, the pump unit operates in the same manner as in Figure 10 but, during the short interval while the injector ram moves in at high speed, the fluid pressure admitted to chamber 168 prevents the unloading valve 148 from lifting and insures that the full delivery of both pumps is maintained to the injector cylinder. The action of the pilot pressure admitted to passage 168 is really effective on the small piston 184 since this pressure is transmitted through the central bore 156 and passage 176 to both end chambers of the bore 52. Accordingly the spool 148 is subjected to the same pressure on its opposite ends and is thereby balanced, the spring 158 acting to retain it in closed position.

Other circuits which require that the pump 16 be unloaded during a part of the cycle by other means than the pressure in delivery conduit 46 or delivery conduit 82 may be accommodated by arrangements shown in Figures 14 and 15. The parts are assembled in the same relationship as in Figures 10 and 11, respectively. In addition, the passage 210 in plate 182 (Figure 4) is connected to a remote pilot control line such as 224, and a plug is placed in the cross bore 214 thus blocking the passage 176 at the lower end of spool 148. Under these conditions the pump action is the same as in Figures 10 and 11, respectively, with the additional feature that by selectively admitting pilot pressure to or exhausting oil from the connection 210, the valve 148 may be lifted and the pump 16 unloaded at times when the pressure in one or the other of the delivery conduits is not sufficient to open the valve. It will be noted that the area over which the pilot pressure operates is several times greater than the area of the piston 84 so that a relatively low pilot pressure may be utilized for this action.

In circuits where it is desired to have the pump act, as in Figure 12, for one part of the cycle and, as shown in Figure 10, for another part of the cycle, the arrangement shown in Figure 16 may be used. In this arrangement both of the threaded portions 190 and 200 are plugged and the plug 186 is removed to receive a pilot connection such as 226. The latter leads from a three-way pilot control valve 228 which is adapted to selectively connect conduit 226 either with the discharge conduit 216 by a pilot connection 230 or with the discharge conduit 220 by a pilot connection 232. Thus, depending upon the position of the pilot valve 228, the valve 148 may be made to act as an unloading valve in response to pressure in the delivery conduit 82 or as a relief valve in response to pressure in the delivery conduit 46.

Where it is desired to, at times, unload the pump 18 independently of pressure in the delivery conduit 82, the arrangement shown in Figure 17 may be utilized. This is the same as shown in Figure 11 except that the plug 146 is removed from end cap 128 (Figure 4) and a pilot connection 234 established to the control chamber 130. Thus a suitable pilot valve may be arranged to remotely vent or block the conduit 234 thereby either opening valve 116 and unloading pump 18 or permitting valve 116 to act as a relief valve in the conventional manner.

The particular examples given in Figures 10 through 17 are merely suggestive of the many possible functions which may be provided by selective assembly of the critical parts of the pump unit disclosed. Obviously other functions may be provided for such other special situations as may be encountered within the capabilities of the apparatus.

While the form of embodiment of the invention as herein disclosed constitutes a preferred form, it is to be understood that other forms might be adopted, all coming within the scope of the claims which follow.

What is claimed is as follows:

1. A multiple pump unit comprising a unitary body having a plurality of pumps mounted therein, passages in the body forming separate delivery conduits for each pump, a passage in the body forming a relief conduit, a normally closed pressure-operated valve connected between one delivery conduit and the relief conduit and normally blocking communication therebetween, and means selectively available for rendering said valve responsive to pressure in either the one delivery conduit or the other delivery conduit.

2. A multiple pump unit comprising a unitary body having a plurality of pumps mounted therein, passages in the body forming separate delivery conduits for each pump, a passage in the body forming a relief conduit and a normally closed pressure-operated valve normally blocking communication between one delivery conduit and the relief conduit and having a valve-operating chamber, a branch passage extending between one delivery conduit and said chamber, a second branch passage extending between the other delivery conduit and said chamber, and means in each branch passage for selectively blocking the same.

3. A pump unit comprising a unitary body having a pump mounted therein, a passage in the body forming a delivery conduit, a passage in the body forming a relief conduit, a normally closed pressure-operated valve normally blocking communication between the delivery conduit and the relief conduit, means responsive to pressure in the delivery conduit for opening the valve when a predetermined pressure is reached in the delivery conduit, and means forming an external connection for pilot control of said valve independently of said pressure.

4. A pump unit comprising a unitary body having a pump mounted therein, a passage in the body forming a delivery conduit, a passage in the body forming a relief conduit, a normally closed pressure-operated valve normally blocking communication between the delivery conduit and the relief conduit, means responsive to pressure in the delivery conduit for opening the valve when a predetermined pressure is reached in the delivery conduit, additional means for opening said valve independently of said pressure, and an external connection to said additional means.

5. A pump unit comprising a unitary body having a pump mounted therein, a passage in the body forming a delivery conduit, a passage in the body forming a relief conduit, a normally closed pressure-operated valve normally blocking communication between the delivery conduit and the relief conduit, means responsive to pressure in the delivery conduit for opening the valve when a predetermined pressure is reached in the delivery conduit, additional means for holding said valve closed independently of said pressure, and an external connection to said additional means.

6. A pump unit comprising a unitary body having a pump mounted therein, a passage in the body forming a delivery conduit, a passage in the body forming a relief conduit, a normally closed pressure-operated valve normally blocking communication between the delivery conduit and the relief conduit, means responsive to pressure in the delivery conduit for opening the valve when a predetermined pressure is reached in the delivery conduit, additional means for holding said valve closed independently of said pressure, and an external connection to said additional means, said means including a cap member selectively attachable to the body in one or another position to render said means effective or ineffective.

7. A multiple pump unit comprising a unitary body having a plurality of pumps mounted therein, passages in the body forming separate delivery conduits for each pump, a passage in the body forming a relief conduit, a branch passage connecting said delivery conduits, means for selectively closing said passage to flow between said delivery conduits either in both directions or in only one direction, a normally closed pressure-operated valve connected between one delivery conduit and the relief conduit and normally blocking communication therebetween, and means selectively available for rendering said valve responsive to pressure in either the one delivery conduit or the other delivery conduit.

8. A multiple pump unit comprising a unitary body having a plurality of pumps mounted therein, passages in the body forming separate delivery conduits for each pump, a passage in the body forming a relief conduit, a branch passage connecting said delivery conduits, means for selectively closing said passage to flow between said delivery conduits either in both directions or in only one direction, a relief valve in the body and controlling communication between one delivery conduit and the relief conduit in response to a predetermined pressure rise in said one conduit, and a selectively operable relief and unloading valve in the body and controlling communication between the other delivery conduit and the relief conduit selectively in response to pressure in either delivery conduit.

9. A multiple pump unit comprising a unitary body having a plurality of pumps mounted therein, passages in the body forming separate delivery conduits for each pump, a passage in the body forming a relief conduit, a branch passage connecting said delivery conduits, and means for selectively closing said branch passage to flow between said delivery conduits either in both directions or in only one direction.

10. A multiple pump unit comprising a unitary body having a plurality of axially aligned pump receiving recesses, a rotary pump mechanism mounted in each recess, a first passage in the body extending to one side of said recesses and forming a delivery conduit for one pump, a second passage in the body extending to the same side of the recesses and forming a delivery conduit for the other pump, means forming a bore transversely intersecting said first passage at said one side of the recesses, means forming a second bore transversely intersecting said second passage at said one side of the recesses, a passage forming a relief conduit and transversely intersecting both said bores at points spaced axially of the bore from the intersection of each bore with the first and second passages, and valve means in each bore for selectively controlling communication of the first and second passages respectively with the relief conduit.

11. A multiple pump unit comprising a unitary body having a plurality of axially aligned pump receiving recesses, a rotary pump mechanism mounted in each recess, a common shaft for driving the pump mechanisms in unison, a first passage in the body extending to one side of said recesses and forming a delivery conduit for one pump, a second passage in the body extending to the same side of the recesses and forming a delivery conduit for the other pump, means forming a bore transversely intersecting said first passage at said one side of the recesses, means forming a second bore transversely intersecting said second passage at said one side of the recesses, a passage forming a relief conduit and transversely intersecting both said bores at points spaced axially of the bore from the intersection of each bore with the first and second passages, and valve means in each bore for selectively controlling communication of the first and second passages respectively with the relief conduit.

12. A multiple pump unit comprising a unitary body having a plurality of axially aligned pump receiving recesses, a rotary pump mechanism mounted in each recess, a first passage in the body extending to one side of said recesses and forming a delivery conduit for one pump, a second passage in the body extending to the same side of the recesses and forming a delivery conduit for the other pump, said passages having a common wall separating them from one another, means forming a passage through said wall, and a check valve mounted in and controlling flow through the last-named passage.

13. A multiple pump unit comprising a unitary body having a plurality of axially aligned pump receiving recesses, a rotary pump mechanism mounted in each recess, a first passage in the body extending to one side of said recesses and forming a delivery conduit for one pump, a second passage in the body extending to the same side of the recesses and forming a delivery conduit for the other pump, said passages having a common wall separating them from one another, means forming a passage through said wall, means forming an opening extending to the outside of the body and in alignment with the last-named passage, and removable closure means for said opening whereby the last-named passage may be rendered accessible for interchangeably mounting therein a check valve or a plug.

14. A multiple pump unit comprising a unitary body having a plurality of axially aligned pump receiving recesses, a rotary pump mechanism mounted in each recess, a first passage in the body extending to one side of said recesses and forming a delivery conduit for one pump, a second passage in the body extending to the same side of the recesses and forming a delivery conduit for the other pump, means forming a bore transversely intersecting said first passage at said one side of the recesses, means forming a second bore transversely intersecting said second passage at said one side of the recesses, said bores extending to the outside of the body, a passage forming a relief conduit and transversely intersecting both said bores at points spaced axially of the bore from the intersection of each bore with the first and second passages, valve means in each bore for selectively controlling communication of the first and second passages respectively with the relief conduit, a common plate mounted on said body and forming a closure for one end of both bores, and means in said plate for conducting actuating fluid to one valve selectively from either of said delivery conduits.

KENNETH R. HERMAN.
FERRIS T. HARRINGTON.